United States Patent [19]

Satterthwaite et al.

[11] 4,250,926
[45] Feb. 17, 1981

[54] CLOSURE DEVICE WITH PERIPHERAL DOUBLE ACTING INFLATABLE SEAL

[76] Inventors: J. Glenn Satterthwaite, 4408 Point West Dr.; Dennis M. Riddleberger, 3517 Marlyn Rd., both of Portsmouth, Va. 23703

[21] Appl. No.: 81,511

[22] Filed: Oct. 3, 1979

Related U.S. Application Data

[63] Continuation of Ser. No. 699,676, Jun. 25, 1976, abandoned.

[51] Int. Cl.³ .............................................. F16L 55/12
[52] U.S. Cl. .......................................... 138/90; 138/93
[58] Field of Search ............................ 138/90, 93, 89

[56] References Cited

U.S. PATENT DOCUMENTS

| 1,710,439 | 4/1929 | Taylor | 138/90 |
| 2,133,730 | 10/1938 | Brundred | 166/85 |
| 3,722,895 | 3/1973 | Mevissen | 277/34.3 |

FOREIGN PATENT DOCUMENTS 3868 of 1895 United Kingdom ................... 138/93

*Primary Examiner*—Willis Little

*Attorney, Agent, or Firm*—Pollock, Vande Sande & Priddy

[57] ABSTRACT

A closure device useable as a test plug to block an extremity of a length of pipe for the pressure testing and repair thereof, including a cylindrical body component formed of two cylindrical half sections operationally readily detachably secured together. The assembled body component of such test plug includes a somewhat T-shaped peripheral channel narrowest at the outer periphery of such test plug body component operationally carrying a circular, inflatable, double acting seal element substantially completely positioned therein when uninflated. On inflation, inner and outer walls of such seal element deform to the same extent, while side walls thereof partially move out of such channel to permit such inner and outer wall deformation; each of such seal element side walls carrying a flange to limit the movement thereof out of such channel. One of such test plug body component half sections includes a web extending thereacross to block the passage of fluid therethrough except when a threaded aperture provided in a raised area thereof is utilized for this purpose; such aperture otherwise being closed by a threaded stopper element. The seal element is removable from such test plug body component peripheral channel when the half sections thereof are separated.

37 Claims, 10 Drawing Figures

CLOSURE DEVICE WITH PERIPHERAL DOUBLE ACTING INFLATABLE SEAL

This is a continuation of application Ser. No. 699,676, filed June 25, 1976 now abandoned.

This invention relates generally to a closure device, and more particularly to a device of this type peripherally carrying an improved inflatable seal element; such device being insertable into a correspondingly shaped opening prior to the inflation of such seal element to completely close such opening upon the inflation of such seal element.

The closure device according to the present invention is particularly adapted to be used as a test plug to close the open ends of pipes for the pressure testing thereof. A municipality owning and maintaining a sewer system, for example, will usually employ a number of persons who expend most of their working time repairing and conducting pressure tests of the various pipes incorporated in such a sewer system, and such persons have been and presently are being provided with various commercially available test plugs useable for this purpose. When a length of sewer pipe extending from one manhole to another manhole is to be tested in this manner, one of such test plugs must be placed in the end of such pipe terminating at one of such manholes and firmly secured therein to close off the same, while another of such test plugs must be similarly placed in the other end of such pipe terminating at the other of such manholes. Each of such test plugs is provided with, for example, an internally screw threaded opening extending therethrough, and a conformingly externally screw threaded stopper element is provided which, in use, seals off such opening provided through each of such test plugs. For the purpose of pressure testing the length of pipe having one of such test plugs blocking each of the extremities thereof terminating adjacent such manholes, the stopper element is removed from one of such test plugs, and a similarly externally screw threaded nozzle element is screwed into such opening through such test plug; such nozzle element being connected to a length of flexible, high pressure hose extending therefrom to a suitable pump capable of pumping water from a suitable source through such length of hose, and the nozzle connected therewith, into such length of pipe. In this manner, internal pressures of up to or around 50 p.s.i. are established within such length of pipe being tested, and any seepage or leakage of water therefrom can then be determined by any premature dropping off of such pressure established therein.

In practice, it has been found that the extremity of a length of pipe incorporated in, for example, a sewer system, terminating at a manhole has frequently been partially obstructed during the construction of such manhole. Consequently, commercially available test plugs, such as the "MUNI-BALL" test plug manufactured by Cherne Industrial, Inc., 5701 South County Road 18, Edina, Minnesota 55436, are provided with an essentially cylindrically shaped, quite elongated, and centrally apertured rigid body section considerably smaller in diameter than the inside diameter of a pipe which it is designed to block; such test plugs being peripherally provided with an inflatable seal formed of rubber or the like which, when uninflated, is of substantially the same diameter as the body section of such test plug. Such a test plug is inserted "end on" into a pipe in a sewer system or the like which it is designed to block, and then the seal element thereof is inflated to bring the same into contact with the cylindrical interior wall of such pipe over a substantial portion of the length of such seal element. Test plugs of this type, as mentioned hereinbefore, are quite elongated in order to provide the seal elements thereof with at least an exterior longitudinally extending wall of sufficient length to prevent the too abrupt curvature thereof when such seal elements are inflated, and consequently the volume of such seal elements when inflated is considerably greater than the volume thereof when uninflated, requiring the expenditure of a great deal of effort on the part of a person conventionally inflating the same, when such test plugs are operationally sited, by the use of a manually operated hand pump of the general type used for the inflation of automobile or bicycle tires or inner tubes. Additionally, such seal elements are quite expensive, due to their lengths, and also due to the necessity of using vulcanization as well as extrusion processes in the manufacture of the same, and are also highly susceptible to damage; test plugs having such seal elements usually being discarded when such seal elements sustain damage, inasmuch as the cost of repairing the same approaches the cost of a new test plug. Despite such disadvantages thereof, however, test plugs of the hereinbefore described type are considered by many to be the best presently commercially available, and are in widespread general use.

Other types of pipe pressure test plugs heretofore known are disclosed in, for example, U.S. Pat. No. 1,710,439 (138–90) issued to O. Taylor on Apr. 23, 1929, and in U.S. Pat. No. 3,451,259 (138–90 XR) granted on June 24, 1969 to C.S. McNulty. While the test plugs disclosed in these references are not as elongated as those of the type manufactured by Cherne Industrial, Inc., as hereinbefore set forth, they are still insertable into a pipe they are designed to block only in an "end on" manner, and in many cases, therefore, are not at all operationally insertable into a pipe having the terminal opening thereof adjacent a manhole partially obstructed by the physical features of such manhole.

A recognition of the shortcomings of the various types of test plugs for the pressure testing of pipes heretofore known, as hereinbefore set forth, has led to the invention of the closure device, peripherally provided with a double acting inflatable seal, forming the subject matter of the present application which, when specifically designed to be used as a test plug, is considered to obviate such deficiencies of such prior art devices, and to provide advantages not obtainable with such prior art devices.

Accordingly, an object of the present invention is the provision of a simple, rugged, and inexpensive closure device peripherally provided with an improved inflatable seal element.

Another object of the instant invention is the provision of a closure device peripherally carrying an inflatable double acting seal element.

Still another object of the present invention is the provision of a closure device peripherally carrying an improved inflatable seal element designed to plug an extremity of a length of pipe.

Yet another object of the instant invention is the provision of a plug for the pressure testing of a length of pipe peripherally carrying an improved inflatable seal element insertable into an extremity of such pipe in an edge on position and thereafter turnable therein to an end on position.

A further object of the present invention is the provision of an improved inflatable seal element peripherally mountable on a closure device having both inner and outer walls undergoing a substantially equivalent change of shape upon the inflation or the deflation of such seal element.

Yet a further object of the instant invention is the provision of a rugged and inexpensive double acting inflatable seal element peripherally mountable on a closure device which is formed of a length of extended elastomeric stock bent into a substantially circular shape and having the ends thereof adhesively bonded together.

According to the present invention, the foregoing and other objects are obtained by providing a closure device for an opening of any desired shape free of any sharp corners; such closure device conforming closely to the shape of such opening and being insertable thereinto. For the purpose of faciliting the description thereof, however, such opening and such closure device therefor will hereinafter be referred to as being of a circular shape, and such closure device will be particularly set forth as a test plug adapted to close an extremity of a length of pipe having a cylindrically shaped interior wall. A test plug constructed in accordance with the instant invention includes a cylindrically shaped body component formed of a suitably rigid metal or a plastic material; such body component having a longitudinal centerline operationally coaxial with the longitudinal centerline of a pipe which it is designed to block. The body component of such test plug is transversely divided into two half sections of substantially equal length, or thickness; each of which includes a ring portion having similar inner and outer diameters, and having operationally abutting inner faces perpendicularly disposed with respect to the longitudinal centerline of such test plug body component and which are operationally secured together in such relationship by a plurality of conventional threaded fastener elements.

The ring portion of each of such half sections of such test plug body component is provided with an outer face parallelly disposed with respect to the inner face thereof having an annular web element projecting radially outwardly therefrom; such web element of each of such half sections of such test plug body component circumferentially carrying adjacent the circular outer edge thereof a rectangularly shaped annular flange directed towards the inner face of such half section of such test plug body component. One of such half sections of such test plug body component is also provided with a central web element situated adjacent the outer face thereof closing the area encompassed by such ring portion thereof, except for a threaded aperture formed through an increased thickness area thereof, which may be closed by a suitable threaded plug, or which may receive a threaded nozzle through which water may be pumped into the interior of a pipe otherwise blocked near an extremity thereof by such test plug for the pressure testing thereof. The somewhat T-shaped peripheral channel of such body component of such test plug defined by the outer cylindrical walls of the ring portion of the two half sections thereof, as well as by the outwardly projecting web section situated adjacent the outer face of each of such half sections of such test plug body component and the inwardly directed flange carried thereby, carries operationally disposed therein an inflatable, double acting, circular seal element formed of a suitable elastomeric material such as rubber. Such seal element, which in cross-section is of a substantially rectangular shape when uninflated, when in such condition has an inner wall with an outer surface of substantially the same diameter, or of a slightly larger diameter, than the outer circular wall of the ring portion of each of the two half sections of such test plug body component, and further has an outer wall with an outer surface of substantially the same diameter as the circular outer edge of the web section projecting outwardly from such ring portion of each of half sections of such test plug body component. The distance between the outer surfaces of the two side walls of such circular seal element is slightly less than the distance between the flanges carried by the outwardly extending web element of each of the half sections of such test plug body component. Each of such side walls of such circular seal element is provided, adjacent the circular inner edge thereof, with a rectangularly shaped flange; the distance between the outer faces thereof being slightly less than the distance between the outwardly extending web element of each of the half sections of such test plug body component. The radial height of each of such flanges of such circular seal element is about half the distance between the outer cylindrical walls of the ring portion of the two half sections such test plug body component and the inner cylindrical walls of the flange carried by the outwardly projecting web section carried by such ring portion of each of such test plug body component half sections. Such circular seal element further is provided with an air valve of the type conventionally provided on automobile and bicycle tires for the inflation thereof; such valve having an elongated cylindrical stem portion extending towards the axial centerline of such seal element operationally passing through a cylindrical bore formed by the provision of adjoining semi-cylindrical grooves provided in the operationally abutting inner faces of the ring portions of such test plug body component half sections. When such circular seal element has been positioned with respect to the half sections of such test plug body component as hereinbefore set forth, and such half sections have been secured together as hereinbefore set forth, the assembled test plug may be inserted into an extremity of a pipe which it is designed to block in any desired attitude with such seal element in an uninflated condition, inasmuch as the maximum dimensions of such assembled test plug with such seal element uninflated is less than the inner diameter of such pipe, and then, if necessary, reoriented to its operative position. Air may then be pumped into the internal circular cavity of such seal element to inflate the same, whereupon the inner and outer walls of such seal element bend or deform into substantially similar arcuate configurations, viewed in cross-section, to bring such outer wall of such seal element into contact with the interior wall of such pipe to lodge such test plug therein and completely block the same. As such seal element of such test plug is inflated, the side walls thereof move away from the axial centerline of such test plug to permit such substantially similar deformation of such inner end outer walls thereof; such movement of such side walls of such seal element being limited to a predetermined distance as the flanges carried thereby adjacent the inner wall thereof come into contact with the outwardly extending web section flanges of the ring portions of such test plug body component half sections. When the testing of a length of pipe has been completed, such test plugs are readily deflated and removable therefrom for subsequent use elsewhere.

A more complete appreciation of the invention and many of the attendant advantages thereof will be readily apparent as the same becomes better understood by reference to the following detailed description when considered in connection with the accompanying drawings wherein.

Figure 1:
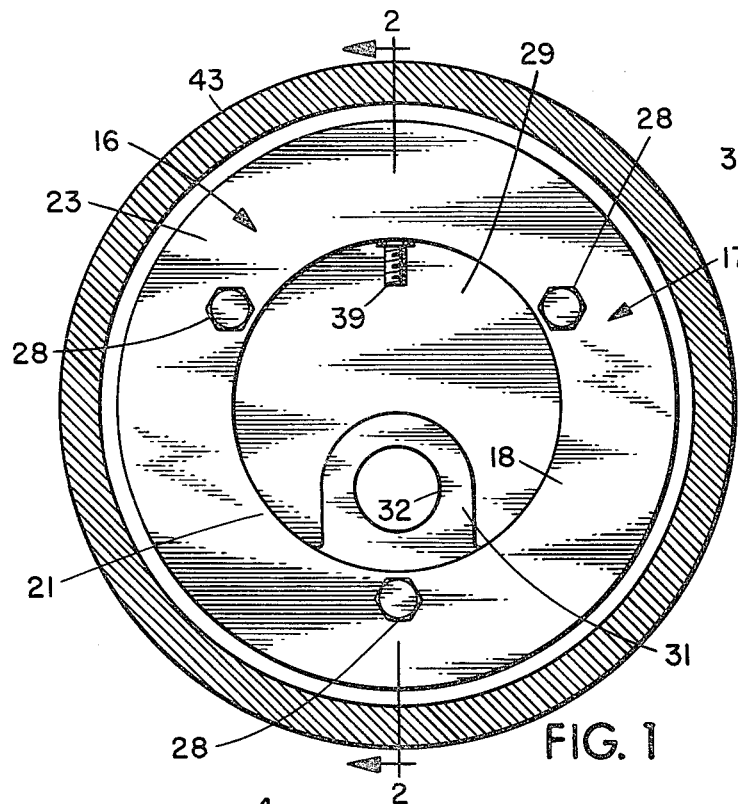
FIG. 1 is a front elevational view of a closure device according to the present invention in the form of a test plug for the pressure testing of pipes operationally positioned in a pipe prior to the inflation of the double acting seal element thereof.
Figure 2:
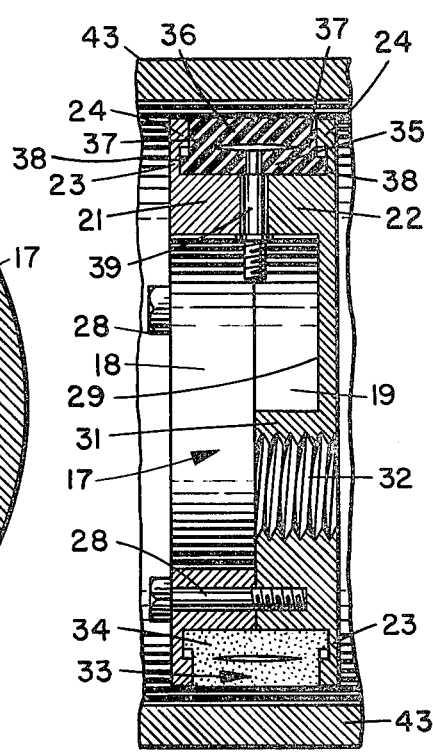
FIG. 2 is a sectional, elevational view thereof taken on the line 2—2 of FIG. 1.
Figure 6:
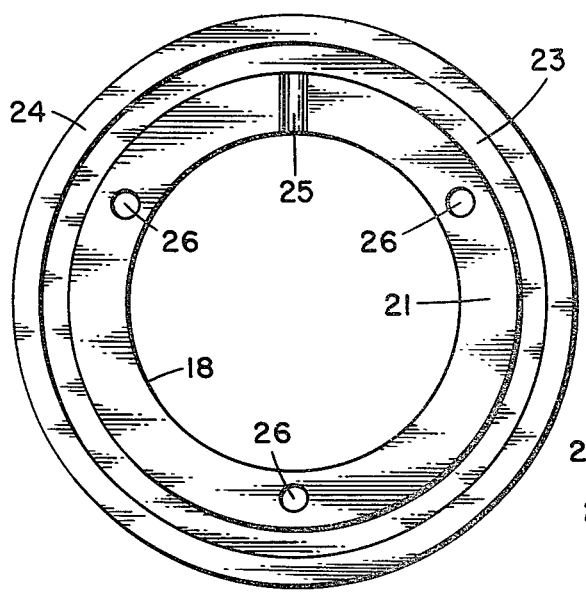
FIG. 6 is a rear elevational view of a first half section of the body component of such test plug.
Figure 7:
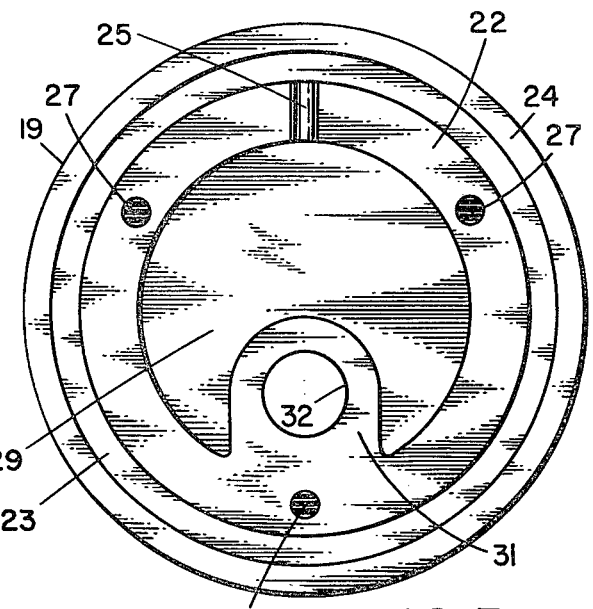
FIG. 7 is a front elevational view of a second half section of the body component of such test plug.

Referring now more particularly to the drawings, wherein like reference numerals designate the same or identical parts throughout the several views, and more specifically to FIGS. 1 and 2, there is shown a closure device, generally designated by the reference numeral 16, in the form of a test p..'g designed to block an extremity of a length of pipe for the pressure testing thereof. Test plug 16 includes a cylindrically shaped body component, generally designated by the reference numeral 17, formed of a suitably rigid metal or a suitably rigid plastic material; such test plug body component having a longitudinal centerline operationally coaxial with the longitudinal centerline of the length of pipe which such test plug 16 is designed to block. The body component 17 of test plug 16 is transversely divided into a first half section 18 and a second half section 19 operatively connected together, as hereinafter set forth; such half sections 18 and 19 of test plug body component 17 being of substantially equal length, or longitudinal thickness. The first half section 18 of test plug body component 17 includes a ring portion 21 extending completely thereacross along the length thereof, and the second half section 19 of test plug body component 17 includes a similar ring portion 22 also extending completely thereacross along the length thereof. The ring portions 21 and 22 of the half sections 18 and 19, respectively, of test plug body component 17 have planar, operatively abutting inner faces perpendicularly disposed with respect to the longitudinal centerline of such test plug body component 17, as well as planar outer faces parallelly disposed with respect to such inner faces thereof, and further have inner and outer cylindrical walls of similar diameters. As shown in FIG. 6 as well as in FIG. 2, an annular web element 23 projects radially outwardly from the ring portion 21 of the test plug body component first half section 18 at the planar outer face thereof; such web element 23 having an outer face coplanar with the outer face of such ring portion 21 of such first half section 18 of the test plug body component 17. The thickness of such web element 23 is relatively small in comparison with the length, or longitudinal thickness, of such ring portion 21 of the first half section 18 of such test plug body component 17, and the circular outer edge of such web element 23 is smaller in diameter than the inside diameter of a pipe which the test plug 16 is designed to block, as more fully set forth hereinafter. Such web element 23 circumferentially carries, along about the outer half thereof, a substantially rectangularly shaped annular flange 24 directed towards the inner planar face of such ring portion 21 of such first half section 18 of the test plug body component 17. The thickness of such flange 24 is about equal to the thickness of such web element 23. The ring portion 22 of the second half section 19 of the test plug body component 17, as shown in FIG. 7 as well as in FIG. 2, is similarly provided with a similar web element 23 in turn similarly carrying a similar flange 24. The outer cylindrical wall of the ring portions 21 and 22 of the half sections 18 and 19, respectively, of test plug body component 17, and such web elements 23 and flanges 24, define a somewhat T-shaped peripheral channel extending completely around the cylindrical body component 17 of test plug 16 throughout the greater part of the length thereof when the half sections 18 and 19 thereof are operatively connected together.

Referring now more explicitly to FIGS. 6 and 7 of the drawings, it will be seen that the operatively abutting inner faces of the ring portions 21 and 22 of the half sections 18 and 19, respectively, of test plug body component 17, are each provided with a semi-cylindrical groove 25 directed radially outwardly from the longitudinal centerline of such test plug body component 17, which are brought into registration to define a cylindrical cavity when such half sections 18 and 19 of such test plug body component 17 are operatively connected together. Further, the ring portion 21 of such first half section 18 of the test plug body component 17 is provided with a plurality of radially equidistantly spaced apertures 26 centrally bored therethrough parallelly to the longitudinal axis of such test plug body component 17; a semi-cylindrical groove 25 being equidistantly situated between two of such apertures 26. Also, the ring portion 22 of such second half section 19 of test plug body component 17 is provided with a like plurality of radially equidistantly spaced tapped holes 27 centrally extending thereinto parallelly to the longitudinal axis of such test plug body component 17 from the inner face thereof; the other of the semi-cylindrical grooves 25 being equidistantly situated between two of such tapped holes 27. The operative interconnection of the half sections 18 and 19 of test plug body component 17 is accomplished by bringing the inner faces of the ring portions 21 and 22 thereof, respectively, into abutment, with such semi-cylindrical grooves 25 in registration, and then inserting a hex-headed stud 28 or other equivalent threaded fastener into each of such apertures 26 formed through the ring portion 21 of the first half section 18 of test plug body component 17 and screwing the same down into the aligned tapped hole 27 formed in the ring portion 22 of the second half section 19 of test plug body component 17.

The second half section 19 of test plug body component 17 further includes a central web section 29 situated adjacent the outer face thereof closing the area encompassed by the ring portion 22 thereof, except in a region 31 thereof of increased thickness which surrounds an internally threaded aperture 32 extending completely therethrough. Such region 31 of such central web section 29, which may be shaped as shown in FIGS. 1 and 7 of the drawings, or may be of another desired shape, is situated adjacent that region of the ring portion 22 of the second half section 19 of such test plug body component 17 most remote from the semi-cylindrical groove 25 provided therein, and such aperture 32, which is parallelly disposed with respect to the longitudinal centerline of such test plug body component 17, is situated substantially adjacent such ring portion 22 of the second half section 19 of test plug body component 17. A suitable threaded plug, not illustrated in the drawing, which may be of the general type shown in U.S. Pat. No. 240,022 De. issued on May 25, 1976, is provided for the purpose of securely closing such aperture 32, whenever desired or necessary, by being screwed thereinto. Alternatively, of course, a threaded nozzle may be screwed into such threaded aperture 32 when the test plug 16 has been inserted into an extremity of a length of pipe to block the same as hereinafter fully set forth, and water may then be pumped through a hose connected to such threaded nozzle through such aperture 32 into such length of pipe to internally pressurize the same.

The test plug 16 includes an inflatable, double acting, circular seal element, generally designated by the reference numeral 33, formed of a suitable elastomeric material such as rubber. The circular seal element 33 includes a body component preferably formed of extruded stock cut to a predetermined length, which is then bent into a loop with the free ends thereof brought substantially into contiguity. The free ends of such length of seal element body component stock are then adhesively bonded together in a congruent relationship by means of an 'anaerobic' resin adhesive 34. Adhesives which have been found suitable fo this purpose include, for example, Duttesive 300 manufactured by Dubois Chemicals, Cincinnati, Ohio 45202, and Loctite 404 manufactured by Loctite Corp., Newington, Conn. 06111. Such body component of seal element 33, which in cross-section is of a substantially rectangular shape when uninflated, has, when in such condition, an inner wall 35 having an exterior surface of substantially the same diameter as, or of a slightly greater diameter than, the outer circular walls of the ring portions 21 and 22 of the half sections 18 and 19, respectively, of test plug body component 17, and further has an outer wall 36 having an exterior surface of substantially the same diameter as the outer circular edges of the web elements 23, and the flanges 24 carried thereby, provided on the half sections 18 and 19 of test plug body component 17. The distance between the parallelly disposed outer surfaces of the side walls 37 of the body component of seal element 33 is slightly less than the distance between the opposed faces of the flanges 24 carried by the outwardly extending web elements 23 of the half sections 18 and 19 of such test plug body component 17. Each of such side walls 37 of the body component of circular seal element 33 is integrally provided, adjacent the circular inner edge thereof, with a rectangularly shaped flange 38; the distance between the outer, planar, parallelly disposed faces thereof being slightly less than the distance between the opposed faces of those portions of such web elements 23 disposed between such flanges 24 and the cylindrical outer walls of the ring portions 21 and 22 of the half sections 18 and 19, respectively, of test plug body component 17. The distance between the concentrically disposed outer faces of such flanges 38 is about half the distance between the cylindrical outer walls of the ring portions 21 and 22 of the half sections 18 and 19, respectively, of test plug body component 17 and the inner cylindrical walls of the flanges 24 carried by the web sections 23 thereof. The thickness of each of the side walls 37 of the body component of circular seal element 33 is equal to about one-fifth of the total distance between the parallelly disposed, planar, exterior faces thereof, and the thickness of the inner wall 35 thereof is about equal to the thickness of a side wall 37 thereof, while the outer wall 36 thereof corresponds in thickness to the inner wall 35 thereof. The inner wall 35 and the outer wall 36 of the body component of circular seal element 33 taper slightly in thickness from a maximum adjacent the side walls 37 of such body component of circular seal element 33 to a minimum at the midpoints thereof. It will be seen, therefore, that when the body component of circular seal element 33 is uninflated, the inner wall 35 thereof, the outer wall 36 thereof, and the side walls 37 thereof enclose a central cavity extending about three-fifths of the distance thereacross, measured between such side walls 37 thereof, having sharp side edges, and which midway between such sharp side edges thereof measures only a small fraction of the distance between such sharp side edges thereof.

The circular seal element 33 is provided with a stem type air valve element 39 of the type conventionally provided on automobile and bicycle tires, or on inner tubes therefor, for the inflation thereof. Such air valve element 39 extends from such central cavity of such body component of circular, inflatable seal element 33 centrally through such inner wall 35 thereof towards the axial centerline of such seal element 33. The air valve element 39 of the circular, inflatable seal element 33, which may be located at any desired point between the ends of the body component thereof connected together by the adhesive 34, includes a cylindrical portion adjacent the exterior surface of the inner wall 35 of such body component of circular, inflatable seal element 33 which will fit snugly into the cylindrical cavity formed by the semi-cylindrical grooves 25 formed in the operationally abutting inner faces of the ring portions 21 and 22 of the half sections 18 and 19, respectively, of test plug body component 17.

The test plug 16 is assembled, obviously, by fitting one axial half of the body component of circular, inflatable seal element 33 thereof, in an uninflated condition, over the ring portion 22 of the second half section 19 of the test plug body component 17 with the cylindrical portion of the air valve element 39 of such seal element 33 disposed to occupy the semi-cylindrical groove 25 formed in the inner face of the ring portion 22 of such second half section 19 of the test plug body component 17. The inner face of the ring portion 21 of the first half section 18 of such test plug 17 is then brought into abutment with the inner face of the ring portion 22 of such second half section 19 of the test plug body component 17; the semi-cylindrical groove 25 formed in the inner face of such ring portion 21 of such first half section 18 of the test plug body component 17 completing the enclosure of such cylindrical portion of the air valve element 39 of the circular, inflatable seal element 33. The studs 28 are then utilized to securely connect the two half sections 18 and 19 of the test plug body component 17 together, as and in the manner hereinbefore set forth.

Figure 3:
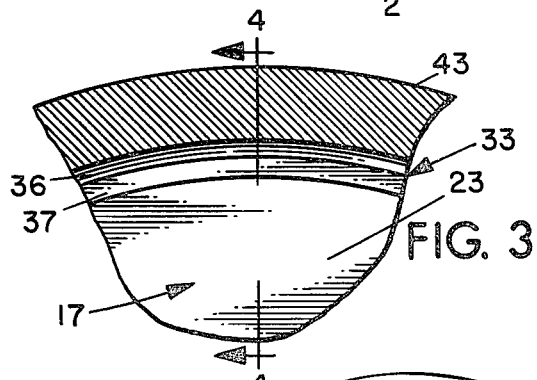
FIG. 3 is a fragmentary front elevational view thereof on an enlarged scale subsequent to the inflation of the double acting seal element thereof to bring the same into contact with the cylindrical interior wall of such pipe.
Figure 4:
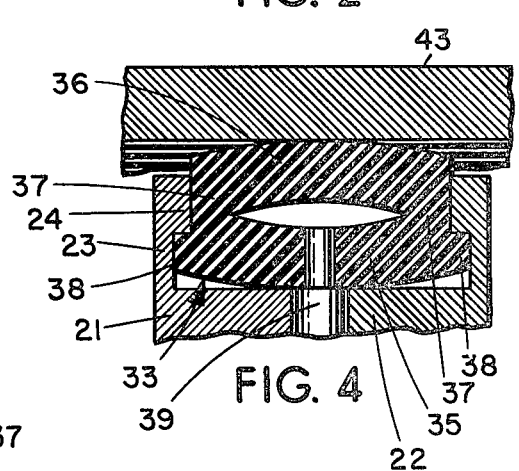
FIG. 4 is a sectional, elevational view thereof taken on the line 4—4 of FIG. 3.
Figure 5:
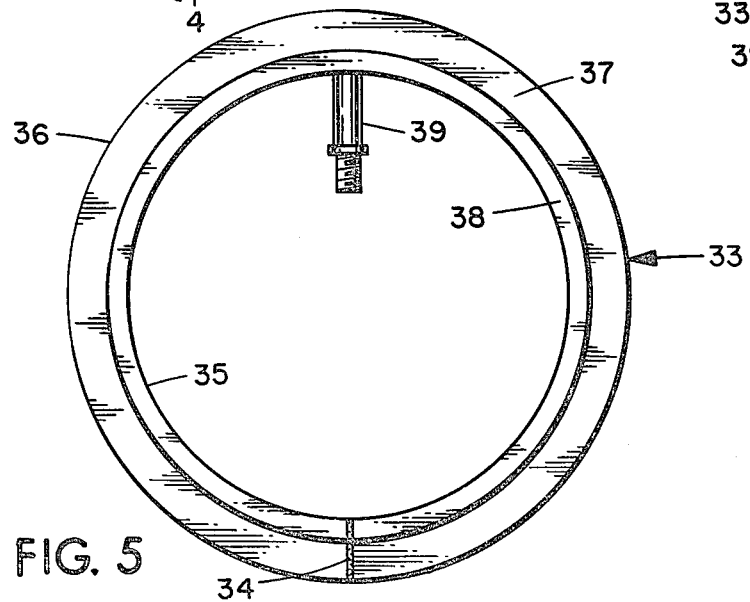
FIG. 5 is a front elevational view of the circular, double acting inflatable seal element incorporated in such test plug.

A salient feature of the presently disclosed invention is the cross-sectional configuration of the body component of the circular, inflatable seal element 33, taken with the cross-sectional configuration of the somewhat T-shaped peripheral channel of test plug body component 17 in which such body component of the circular, inflatable seal element 33 is operationally disposed. When such body component of such circular, inflatable seal element 33 is formed of a predetermined length of straight, extruded, stock material, as hereinbefore set forth, the central cavity thereof is virtually closed, and substantial compression stresses are established in the inner wall 35 thereof while substantially equal tensile stresses are established in the outer wall 36 thereof. A "stress balance" is maintained when the mean length of the straight stock prior to formation of the same into the body component of the circular, inflatable seal element 33 is less than the circumferential length of the true centerline of the cross-sectional configuration of such body component of seal element 33, measured between the exterior surfaces of the inner wall 35 and the outer wall 36 thereof. When the body component of the circular, inflatable seal element 33 is shaped and formed in the manner hereinbefore disclosed, and is then operationally mounted on the test plug body component 17 in the hereinbefore set forth manner, a very unique action occurs when the same is inflated by the admission of air into the central cavity thereof through the air valve element 39. Inasmuch as the inner wall 35 of the body component of the circular, inflatable seal element 33 cannot move inwardly towards the longitudinal or axial centerline of the test plug 16, any and all action must occur in a direction taken radially away from such axial centerline of such test plug 16. Consequently, both the inner wall 35 and the outer wall 36 of the body component of seal element 33 bend equally to equally contribute to the outwardly directed displacement of the midpoint of the exterior surface of the outer wall 36 of such body component of seal element 33, while the side walls 37 of such body component of seal element 33 move radially outwardly half the distance which the midpoint of such exterior surface of the outer wall 36 of such body component of seal element 33 moves; hence the designation herein of such seal element 33 as an inflatable, double-acting seal element. It will be clearly apparent that, when both the inner wall 35 and outer wall 36 of the body component of the circular, inflatable, double-acting seal element 33 bend equally in the attainment of the desired outward displacement of the midpoint of such outer wall 36 thereof, the degree of bending experienced by each of such walls would only be half of that which would be experienced by such outer wall 36 in the attainment of the desired displacement of the midpoint thereof if the inner wall 35 thereof were not at all bendable upon inflation of such body component of seal element 33. Such minimal bending of the inner wall 35 and the outer wall 36 of such body component of such circular, inflatable, double-acting seal element 33 is the one factor permitting the use of the adhesive 34 for joining together the ends of a length of straight stock to form such body component of seal element 33. More particularly, adhesives such as the adhesive 34, when used in the formation of the body component of seal element 33 as hereinbefore set forth, become quite brittle after cure is reached, which normally requires about twenty-four hours after the employment of the same to make the hereinbefore disclosed joint in such body component of seal element 33. Thereafter, such a bonded joint, which will withstand very high loadings applied in a direction normal to the plane thereof, will permit only a very slight bending in the plane thereof, and will not withstand stresses in the plane thereof caused by expansion or elongation of the abutting surfaces so joined together which would fracture the bond and permit the leakage of air from the central cavity of such body component of seal element 33. The design of such body component of seal element 33 and the somewhat T-shaped peripheral channel of the test plug body component 17 in which such body component of seal element 33 is operationally situated, however, is such that the stresses developed in such bonded joint employing the adhesive 34 do not exceed the limits which such bonded joint is capable of withstanding. Referring now to FIGS. 3 and 4 of the drawings, it will be seen that, when such body component of such circular, inflatable double-acting seal element 33 is operationally inflated, the inner wall 35 and the outer wall 36 bend to the same degree, while the side walls 37 thereof move out of such somewhat T-shaped channel to permit such equal bending of such walls 35 and 36 thereof. When the outer wall 36 of the body component of such seal element 33 has been brought firmly into contact with the cylindrical interior wall of a pipe which the test plug 16 incorporating such seal element 33 has been designed to block, the cylindrical outer wall of each of the flanges 38 carried on the side walls 37 of such body component of seal element 33 comes into contact with the inner cylindrical wall of the adjacent flange 24 carried by the adjacent web element 23 provided on each of the half sections 18 and 19 of test plug body component 17. The cross-sectional configuration of such inflated body component of the seal element 33 thereafter remains the same so long as such body component of seal element 33 is operationally so inflated, and the bending of the walls 35 and 36 thereof in such inflated configuration thereof is insufficient to fracture the adhesive 34 utilized to form the bonded joint in such seal element 33 as hereinbefore set forth. Without the utilization of the double-acting feature of the hereinbefore described body component of the circular, inflatable seal element, the joint in the same would of necessity require the formation thereof by a vulcanization process, which is presently required in the manufacture of the body components of the circular, inflatable seal elements of all heretofore known test plugs incorporating the same, and which would have the effect of increasing by about ten-fold the cost of manufacturing the same.

It will be noted that the very heavy wall construction of the body component of the circular, inflatable, double-acting seal element 33 hereinbefore set forth makes it almost impervious to damage in use. If such damage should occur, however, rendering such seal element 33 useless, it will be noted that the same could be very quickly removed from the test plug 16 incorporating the same for disposal, and that a replacement seal element 33 could then be very quickly installed in lieu thereof. It will also be noted that the great wall strength of the body component of the circular, inflatable, double-acting seal element 33 permits the same to be so securely or solidly installed in the extremity of a length of pipe to block the same that test pressures therein of up to 200 p.s.i. are entirely feasible. Further, the increase in the volume of the central cavity of the body component of such circular, inflatable, double-acting seal element 33 when the same is brought from an uninflated condition to its fully inflated operational condition is so slight that only about two strokes of the piston element of an ordinary manually operable bicycle tire inflation pump would be required to fully inflate such body component of a seal element 33, resulting in a minimum expenditure of time and effort in operationally securing a test plug 16 incorporating the same in an extremity of a length of pipe.

Figure 8:
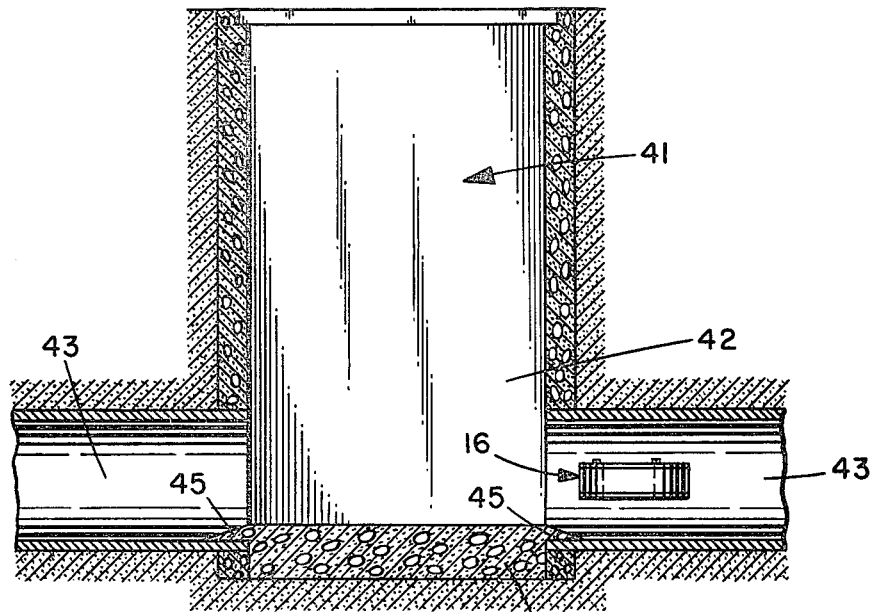
FIG. 8 is a sectional, elevational view of a portion of a municipal sewer system or the like showing the insertion of a test plug according to the instant invention into the partially obstructed extremity of a pipe incorporated in such system located at a manhole incorporated in such system.
Figure 9:
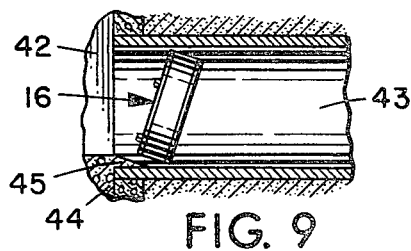
FIG. 9 is a sectional, elevational view of a portion of such system showing such test plug being reoriented within such pipe to bring the same into its operative position; and, FIG. 10 is a sectional, elevational view of a portion of such system showing such test plug in its operative position in such pipe prior to the inflation of the double acting seal element thereof.
Figure 10:
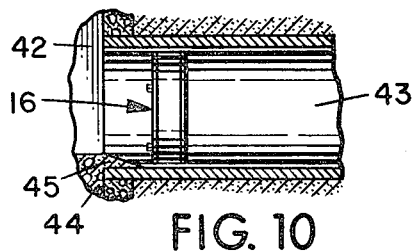

Another salient feature of the instant invention is illustrated in FIGS. 8 and 10 of the drawings. In FIG. 8 there is somewhat schematically shown a portion of a municipal sewer system 41 or the like, having a manhole wall structure 42 extending downwardly from ground level. The extremities of a pair of pipes 43 are situated at opposite sides of such manhole wall construction 42 near the lower extremity thereof for fluid communication therewith. A concrete bench 44 usually closes the lower extremity of such manhole wall structures 42; such concrete benches 44 usually being poured in site and smoothly leveled off thereafter. Although the upper surfaces of such concrete benches 44 should not be situated at a level higher than the lower extremities of the interiors of the pipes 43 entering the manholes in which such benches 44 are provided, it has been found that, in practice, the upper surface of such a concrete bench 44 is frequently located from about ⅜" to about ½" or more above the interior lower extremities of such pipes 43, and that tapered or faired "fillets" 45 project from such concrete benches 44 into such pipes 43. Obviously, certain of the pipe pressure testing plugs heretofore known are not at all insertable into the partially obstructed extremities of such pipes 43, while others insertable into such partially obstructed pipes 43 in an "end on" manner must be provided with greatly expansible, peripherally disposed, inflatable seal elements. A test plug 16 according to the present invention is, however, freely insertable into such a partially obstructed pipe 43 in an "edge on" manner, as shown in FIG. 8, where it is thereafter reoriented, as shown in FIG. 9, to bring the same into its operative position shown in FIG. 10, where the body component of the circular, inflatable, double-acting seal element 33 incorporated therein is subsequently inflated to permit such test plug 16 to securely block such extremity of such pipe 43.

In order for the test plug 16 to be insertable into the extremity of a pipe 43 in an "edge on" manner, as set forth hereinbefore, the dimensions thereof with respect to the interior diameter of such pipe 43 must be carefully selected. For example, a test plug 16 adapted to be so inserted into a pipe 43 having an inside diameter of 8" would include a body component 17 having a maximum diameter of 7 9/16" and a length, measured along the longitudinal centerline thereof, 2¼". The maximum dimension of such a test plug body component 17, measured in a diagonal direction, would be 7⅞"; which, being ⅛" less than the inside diameter of the pipe 43 into which it is inserted, freely permits the reorientation thereof within such pipe 43. When such test plug 16 has been brought into the position illustrated in FIG. 10 of the drawings, the subsequent inflation of the body component of the seal element 33 thereof would require an outward displacement of the midportion of the outer wall 36 thereof of only 7/32". The side walls 37 of such body component of a seal element 33 would, therefore, be required to emerge from the somewhat T-shaped peripheral channel of the test plug component 17 only 7/64". Inasmuch as the side walls 37 of such body component of such seal element 33 measure ¾" between the circular, concentrically situated edges thereof, with a distance between such side walls 37 of such body component of such seal element 33 of 1 11/16", it will be seen that the total displacement in bending of each of the inner wall 35 and outer wall 36 of such body component of such seal element 33 will only be 7/64" at the midpoint of an effective length of 1 11/16", which would be too slight to cause rupture of the adhesive 34 forming the bonded joint in such body component of such seal element 33.

It will be apparent that test plugs 16 intended to block the extremities of pipes 43 having other inside dimensions will be made with dimensions bearing substantially the same ratio to the inside diameter of such pipes that the specific dimensions set out hereinbefore bear to 8".

Closure devices other than test plugs adapted to block the extremities of a length of pipe for the pressure testing thereof are also considered to fall within the scope of the present invention. One other closure device contemplated herein could be a door adapted to close an opening in a wall or bulkhead, which could even be square or rectangular in shape provided that the corners thereof are interiorly rounded. Another closure device according to the instant invention could be a hatch cover adapted to be securely mounted on a coaming projecting upwardly from the deck of a ship and surrounding a cargo hatch opening therein.

Obviously, many other modifications and variations of the present invention are possible in the light of the foregoing teachings. It is therefore to be understood that within the scope of the appended claims the invention may be practiced otherwise than as specifically described.

What is claimed as new and desired to be secured by Letters Patent of the United States is:

1. A seal element adapted to be peripherally carried by a closure device, comprising:
(a) an inflatable, substantially loop shaped body component formed of an initially straight length of elastomeric material subsequently bent into a loop with the initially free ends thereof congruently adhesively bonded together, said body component including an inner wall having an exterior surface surrounding a longitudinal axis of said seal element body component, an outer wall having an exterior surface substantially concentrically parallel to said exterior surface of said inner wall thereof when said seal element body component is uninflated, and a pair of side walls interconnecting said inner and outer walls of said seal element body component, at least a portion of the exterior surface of each of said side walls of said seal element body component being operationally substantially situated in a plane substantially perpendicular to said longitudinal axis of said seal element body component, said walls of said seal element body component enclosing an elongated central cavity formed therein having a major axis substantially equidistantly situated between said exterior surfaces of said inner and outer walls of said seal element body component and extending more than half of the distance between said exterior surfaces of said side walls of said seal element body component with the midpoint of said major axis of said central cavity of said seal element body component substantially equidistantly spaced from said exterior surfaces of said side walls thereof; said elongated central cavity of said seal element body component having a minor axis measuring only a small fraction of the length of said major axis thereof when said seal element body component is uninflated; and, (b) an air valve extending through one of said walls of said body component of said seal element for fluid communication with said central cavity thereof.

2. The seal element according to claim 1, wherein said side walls of said seal element body component are each integrally provided with a flange situated adjacent said exterior surface of said inner wall of said seal element body component.

3. The seal element according to claim 1, wherein said air valve extends from said central cavity of said seal element body component substantially centrally through said inner wall thereof towards said longitudinal axis of said seal element.

4. The seal element according to claim 3, wherein said side walls of said seal element body component are each integrally provided with a flange situated adjacent said exterior surface of said inner wall of said seal element body component.

5. The seal element according to claim 1, wherein said side walls of said seal element body component are each integrally provided with a flange situated adjacent said exterior surface of said seal element body component.

6. The seal element according to claim 5, wherein said air valve extends from said central cavity of said seal element body component substantially centrally through said inner wall thereof towards said longitudinal axis of said seal element.

7. A closure device adapted to block an opening, comprising:

(a) a body component adapted to be operationally positioned in said opening and having a periphery operationally substantially uniformly spaced from the periphery of said opening, said closure device body component having a longitudinal axis operationally substantially perpendicularly disposed with respect to the plane of said opening and including first and second longitudinally separable sections operationally connected together, said longitudinally separable sections of said closure device body component similarly including means cooperating to define an outwardly opening channel peripherally extending completely thereabout, one of said longitudinally separable sections of said closure device body component further including means transversely closing the area thereof interiorly of said outwardly opening channel; and, (b) a seal element having a double acting, inflatable body component formed from an initially straight length of rubber stock material subsequently bent into a loop with the initially free ends thereof congruently adhesively bonded together, said seal element body component being operationally substantially completely positioned in said outwardly opening peripheral channel of said closure device body component when uninflated, said seal element body component including an inner wall having an an exterior surface substantially completely contacting an inner wall of said peripheral channel of said closure device body component when said seal element body component is uninflated, said seal element body component further including an outer wall having an outer surface substantially parallel to said exterior surface of said inner wall thereof when said seal element body component is uninflated as well as a pair of side walls interconnecting said inner and outer walls thereof, said walls of said seal element body component enclosing an elongated central cavity formed therein having a major axis substantially equidistantly situtated between said exterior surfaces of said inner and outer walls of said seal element body component and extending more than half of the distance between the exterior surfaces of said side walls of said seal element body component with the midpoint of said major axis of said central cavity of said seal element body component substantially equidistantly spaced from said exterior surfaces of said side walls thereof, said elongated central cavity of said seal element body component having a minor axis measuring only a small fraction of the length of said major axis thereof when said seal element body component is uninflated, said seal element including an air valve extending through one of said walls of said body component thereof for fluid communication with said central cavity thereof, said inner and outer walls of said seal element body component assuming a substantially equally arcuate configuration when said seal element body component is inflated to bring at least the midpoint of said exterior surface of said outer wall thereof into contact with said periphery of said opening while said side walls of said seal element body component move outwardly in said peripheral channel of said closure device body component a distance substantially equal to half the increase in the spacing between the midpoints of said exterior surfaces of said inner and outer walls of said seal element body component.

8. The closure device according to claim 7, wherein said side walls of said seal element body component are each integrally provided with a flange situated adjacent said exterior surface of said inner wall of said element body component, and wherein said peripheral channel of said closure device body component includes spaced flanges situated adjacent the peripheral mouth thereof engageable by said flanges provided on said side walls of said seal element body component to limit the emergence of said side walls of said seal element body component from said peripheral channel of said closure device body component.

9. The closure device according to claim 7, wherein said air valve extends from said central cavity of said seal element body component through said inner wall thereof and then through a cavity formed by semi-cavities provided on each of said longitudinally separable sections of said closure device body component operationally brought into registration.

10. The closure device according to claim 9, wherein said side walls of said seal element body component are each integrally provided with a flange situated adjacent said exterior surface of said inner wall of said seal element body component, and wherein said peripheral channel of said closure device body component includes spaced flanges situated adjacent the peripheral mouth thereof engageable by said flanges provided on said side walls of said seal element body component to limit the emergence of said side walls of said seal element body component from said peripheral channel of said closure device body component.

11. A test plug adapted to block an extremity of a length of pipe having a cylindrical inner wall for the pressure testing thereof, comprising:
 (a) a cylindrical body component adapted to be operationally positioned in said pipe with the longitudinal axis thereof operationally coaxial with the longitudinal axis of said length of pipe, said test plug body component having a circular periphery operationally uniformly spaced from the cylindrical inner wall of said pipe and including first and second longitudinally separable sections, said longitudinally separable sections of said test plug body component each including a portion having at least a cylindrical outer wall equally smaller in diameter than said circular periphery of said test plug body component, said portions of said longitudinally separable sections of said test plug body component each further including a web section extending radially outwardly from said cylindrical outer wall thereof to said circular periphery of said test plug body component, said web sections being operationally spaced at the opposite ends of said cylindrical test plug body component, said web section and said cylindrical outer wall of said portion of each of said longitudinally separable sections of said test plug body component defining an outwardly opening peripheral channel of uniform depth extending completely around said test plug body component, one of said longitudinally separable sections of said test plug body component further including means transversely closing the area thereof encompassed by said cylindrical outer wall of said portion thereof; and,
 (b) a seal element having a double acting, inflatable body component formed of an initially straight length of rubber stock material subsequently bent into a loop with the initially free ends thereof congruently adhesively bonded together, said inflatable body component being operationally substantially completely positioned in said outwardly opening peripheral channel of said test plug body component when uninflated, said seal element body component including an inner wall having a cylindrical inner surface substantially completely contacting said cylindrical outer walls of said portions of said longitudinally separable sections of said test plug body component when uninflated, said seal element body component further including an outer wall having a substantially cylindrical outer surface of substantially the same diameter as the diameter of said test plug body component when said seal element body component is uninflated as well as a pair of side walls interconnecting said inner and outer walls thereof, said walls of said seal element body component enclosing an elongated central cavity formed therein having a major axis substantially equidistantly situated between said exterior surfaces of said inner and outer walls of said seal element body component and extending more than one half of the distance between the exterior surfaces of said side walls of said seal element body component with the midpoint of said major axis of said central cavity of said seal element body component substantially equidistantly spaced from said exterior surfaces of said side walls thereof, said elongated central cavity of said seal element body component having a minor axis measuring only a small fraction of the length of said major axis thereof when said seal element body component is uninflated, said seal element including an air valve extending through one of said walls thereof for fluid communication with said central cavity thereof, said inner and outer walls of said seal element body component assuming a substantially equally arcuate configuration when said seal element body component is inflated to bring at least the midpoint of said exterior surface of said outer wall thereof into contact with said cylindrical inner wall of said pipe while said side walls of said seal element body component move outwardly in said peripheral channel of said test plug body component a distance substantially equal to half the increase in the spacing between the midpoints of said exterior surfaces of said inner and outer walls of said seal element body component.

12. The test plug according to claim 11, wherein said side walls of said seal element body component are each integrally provided with a flange situated adjacent said substantially cylindrical exterior surface of said inner wall of said seal element body component, and wherein said peripheral channel of said test plug body component includes spaced flanges situated adjacent the peripheral mouth thereof engageable by said flanges provided on said side walls of said seal element body component to limit the emergence of said side walls of said seal element body component from said peripheral channel of said test plug body component.

13. The test plug according to claim 11, wherein said air valve extends from said central cavity of said seal element body component through said inner wall thereof and then through a cavity formed by semi-cavities provided on each of said portions having at least a cylindrical outer wall of said longitudinally separable sections of said test plug body component operationally brought into registration.

14. The test plug according to claim 13, wherein said side walls of said seal element body component are each integrally provided with a flange situated adjacent said substantially cylindrical exterior surface of said inner wall of said seal element body component, and wherein said peripheral channel of said test plug body component includes spaced flanges situated adjacent the peripheral mouth thereof engageable by said flanges provided on said side walls of said seal element body component to limit the emergence of said side walls of said seal element body component from said peripheral channel of said test plug body component.

15. A test plug adapted to block an extremity of a length of pipe having a cylindrical inner wall for the pressure testing thereof, comprising:
 (a) a cylindrical body component adapted to be operationally positioned in said pipe with the longitudinal axis thereof coaxial with the longitudinal axis of said length of pipe, said test plug body component having a substantially cylindrical wall operationally uniformly spaced from the cylindrical inner wall of said pipe; and, (b) an inflatable seal element having a circular body component operationally positioned about and substantially snugly encircling said substantially cylindrical wall of said test plug body component, said seal element when uninflated including a substantially cylindrical outer wall, said seal element further including longitudinally spaced end walls and an inner wall, the thickness of each of said end walls of said seal element body component being substantially equal to one-fifth of the distance between the exterior surfaces of said end walls thereof, and said inner and outer walls of said seal element body component being of a maximum thickness adjacent said end walls of said seal element body component substantially equal to the thickness of each of said end walls thereof and being of a minimum thickness at the midpoints thereof only slightly smaller than said maximum thickness thereof, said seal element body component when positioned about and substantially snugly encircling said substantially cylindrical wall of said test plug body component having a maximum dimension when uninflated measured diagonally from a point adjacent the intersection of said outer wall thereof and one of said longitudinally spaced end walls thereof to a diametrically opposed point adjacent the intersection of said outer wall thereof and the other of said longitudinally spaced end walls thereof smaller than the inside diameter of said pipe said test plug is adapted to block, said seal element operationally being inflated to expand outwardly into contact with said cylindrical inner wall of said pipe.

16. A test plug adapted to block an extremity of a length of pipe having a cylindrical inner wall for the pressure testing thereof, comprising:

(a) a cylindrical body component adapted to be operationally positioned in said pipe with the longitudinal axis thereof coaxial with the longitudinal axis of said length of pipe, said test plug body component having a circular periphery operationally uniformly spaced from the cylindrical inner wall of said pipe and having parallelly disposed longitudinally spaced ends, said test plug body component including first and second longitudinally separable sections operationally connected together to define an outwardly opening peripheral channel including a cylindrical surface and extending completely therearound and over a considerable portion of the distance between said parallelly disposed longitudinally spaced ends of said test plug body component, said test plug body component having a maximum dimension measured diagonally from a point on the circular periphery of one of said longitudinally spaced ends thereof to a diametrically opposed point on the circular periphery of the other of said longitudinally spaced ends thereof smaller than the inside diameter of the pipe said test plug is adapted to block; and, (b) an inflatable seal element having a body component operatively positioned in said test plug body component peripheral channel operationally inflatable to expand outwardly into contact with said cylindrical inner wall of said pipe, said inflatable seal element body component comprising an inner wall having an exterior cylindrical surface substantially completely contacting said cylindrical surface of said peripheral channel of said test plug body component when said seal element body component is uninflated, an outer wall having an exterior cylindrical surface of substantially the same diameter as said circular periphery of said test plug body component when said seal element body component is uninflated, and a pair of side walls interconnecting said inner and outer walls thereof; the thickness of each of said side walls of said seal element body component being substantially one-fifth of the distance between the exterior surfaces of said side walls thereof, and said inner and outer walls of said seal element body component being of a maximum thickness adjacent said side walls of said seal element body component substantially equal to the thickness of each of said side walls thereof and being of a minimum thickness at the midpoints thereof only slightly smaller than said maximum thickness thereof.

17. A seal element adapted to be peripherally carried by a closure device, comprising:

(a) an inflatable, substantially loop shaped body component formed of an elastomeric material including an inner wall having an exterior surface surrounding a longitudinal axis of said seal element body component, an outer wall having an exterior surface substantially concentrically parallel to said exterior surface of said inner wall thereof when said seal element body component is uninflated, and a pair of side walls interconnecting said inner and outer walls of said seal element body component, at least a portion of the exterior surface of each of said side walls of said seal element body component being operationally substantially situated in a plane substantially perpendicular to said longitudinal axis of said seal element body component, said walls of said seal element body component enclosing an elongated central cavity formed therein having a major axis substantially equidistantly situated between said exterior surfaces of said inner and outer walls of said seal element body component and extending more than half of the distance between said exterior surfaces of said side walls of said seal element body component with the midpoint of said major axis of said central cavity of said seal element body component substantially equidistantly spaced from said exterior surfaces of said side walls thereof; said elongated central cavity of said seal element body component having a minor axis measuring only a small fraction of the length of said major axis thereof when said seal element body component is uninflated; the thickness of each of said side walls of said seal element body component being substantially equal to one-fifth of the distance between the exterior surfaces of said side walls thereof, and said inner and outer walls of said seal element body component being of a maximum thickness adjacent said side walls of said seal element body component substantially equal to the thickness of each of said side walls thereof and being of a minimum thickness at the midpoints thereof only slightly smaller than said maximum thickness thereof; and (b) an air valve extending through one of said walls of said body component of said seal element for fluid communication with said central cavity thereof.

18. A closure device adapted to block an opening, comprising:
(a) a body component adapted to be operationally positioned in said opening and having a periphery operationally substantially uniformly spaced from the peripheral of said opening, said closure device body component having a longitudinal axis operationally substantially perpendicularly disposed with respect to the plane of said opening and including first and second longitudinally separable sections operationally connected together, said longitudinally separable sections of said closure device body component similarly including means cooperating to define an outwardly opening channel peripherally extending completely thereabout, one of said longitudinally separable sections of said closure device body component further including means transversely closing the area thereof interiorly of said outwardly opening channel, said outwardly opening channel comprising spaced flanges situated adjacent the peripheral mouth thereof; and,
(b) a seal element having a double acting, inflatable body component formed of an elastomeric material operationally substantially completely positioned in said outwardly opening peripheral channel of said closure device body component when uninflated, said seal element body component including an inner wall having an exterior surface substantially completely contacting an inner wall of said peripheral channel of said closure device body component when said seal element body component is uninflated, said seal element body component further including an outer wall having an outer surface substantially parallel to said exterior surface of said inner wall thereof when said seal element body component is uninflated as well as a pair of side walls interconnecting said inner and outer walls thereof, said side walls each being provided with an integral flange on its exterior surface in position to engage said flanges provided in said channel to limit the emergence of said side walls of said seal element body component from said outwardly opening channel of said closure device body component, said walls of said seal element body component enclosing an elongated central cavity formed therein having a major axis substantially equidistantly situated between said exterior surfaces of said inner and outer walls of said seal element body component and extending more than half of the distance between the exterior surfaces of said side walls of said seal element body component with the midpoint of said major axis of said central cavity of said seal element body component substantially equidistantly spaced from said exterior surfaces of said side walls thereof, said elongated central cavity of said seal element body component having a minor axis measuring only a small fraction of the length of said major axis thereof when said seal element body component is uninflated, said seal element including an air valve extending through one of said walls of said body component thereof for fluid communication with said central cavity thereof, said inner and outer walls of said seal element body component assuming a substantially equally arcuate configuration when said seal element body component is inflated to bring at least the midpoint of said exterior surface of said outer wall thereof into contact with said periphery of said opening while said side walls of said seal element body component move outwardly in said peripheral channel of said closure device body component a distance substantially equal to half the increase in the spacing between the midpoints of said exterior surfaces of said inner and outer walls of said seal element body component.

19. The closure device according to claim 18, wherein said air valve extends from said central cavity of said seal element body component through said inner wall thereof and then through a cavity formed by semi-cavities provided on each of said longitudinally separable sections of said closure device body component operationally brought into registration.

20. A closure device adapted to block an opening, comprising:
(a) a body component adapted to be operationally positioned in said opening and having a periphery operationally substantially uniformly spaced from the periphery of said opening, said closure device body component having a longitudinal axis operationally substantially perpendicularly disposed with respect to the plane of said opening and including first and second longitudinally separable sections operationally connected together, said longitudinally separable sections of said closure device body component similarly including means cooperating to define an outwardly opening channel peripherally extending completely thereabout, one of said longitudinally separable sections of said closure device body component further including means transversely closing the area thereof interiorly of said outwardly opening channel; and,
(b) a seal element having a double acting, inflatable body component formed of an elastomeric material operationally substantially completely positioned in said outwardly opening peripheral channel of said closure device body component when uninflated, said seal element body component including an inner wall having an exterior surface substantially completely contacting an inner wall of said peripheral channel of said closure device body component when said seal element body component is uninflated, said seal element body component further including an outer wall having an outer surface substantially parallel to said exterior surface of said inner wall thereof when said seal element body component is uninflated as well as a pair of side walls interconnecting said inner and outer walls thereof, the thickness of each of said side walls of said seal element body component being substantially equal to one-fifth of the distance between the exterior surfaces of said side walls thereof, and said inner and outer walls of said seal element body component being of a maximum thickness adjacent said side walls of said seal element body component substantially equal to the thickness of each of said side walls thereof and being of a minimum thickness at the midpoints thereof only slightly smaller than said maximum thickness thereof, said walls of said seal element body component enclosing an elongated central cavity formed therein having a major axis substantially equidistantly situated between said exterior surfaces of said inner and outer walls of said seal element body component and extending more than half of the distance between the exterior surfaces of said side walls of said seal element body component with the midpoint of said major axis of said central cavity of said seal element body component substantially equidistantly spaced from said exterior surfaces of said side walls thereof, said elongated central cavity of said seal element body component having a minor axis measuring only a small fraction of the length of said major axis thereof when said seal element body component is uninflated, said seal element including an air valve extending through one of said walls of said body component thereof for fluid communication with said central cavity thereof, said inner and outer walls of said seal element body component assuming a substantially equally arcuate configuration when said seal element body component is inflated to bring at least the midpoint of said exterior surface of said outer wall thereof into contact with said periphery of said opening while said side walls of said seal element body component move outwardly in said peripheral channel of said closure device body component a distance substantially equal to half the increase in the spacing between the midpoints of said exterior surfaces of said inner and outer walls of said seal element body component.

21. A test plug adapted to block an extremity of a length of pipe having a cylindrical inner wall for the pressure testing thereof, comprising:

(a) a cylindrical body component adapted to be operationally positioned in said pipe with the longitudinal axis thereof operationally coaxial with the longitudinal axis of said length of pipe, said test plug body component having a circular periphery operationally uniformly spaced from the cylindrical inner wall of said pipe and including first and second longitudinally separable sections, said longitudinally separable sections of said test plug body component each including a portion having at least a cylindrical outer wall equally smaller in diameter than said circular periphery of said test plug body component, said portions of said longitudinally separable sections of said test plug body component each further including a web section extending radially outwardly from said cylindrical outer wall thereof to said circular periphery of said test plug body component, said web sections being operationally spaced at the opposite ends of said cylindrical test plug body component, said web section and said cylindrical outer wall of said portion of each of said longitudinally separable sections of said test plug body component defining an outwardly opening peripheral channel of uniform depth extending completely around said test plug body component, said outwardly opening channel comprising spaced flanges situated near the peripheral mouth thereof, one of said longitudinally separable sections of said test plug body component further including means transversely closing the area thereof encompassed by said cylindrical outer wall of said portion thereof; and, (b) a seal element having a double acting, inflatable body component formed of an elastomeric material operationally substantially completely positioned in said outwardly opening peripheral channel of said test plug body component when uninflated, said seal element body component including an inner wall having a cylindrical inner surface substantially completely contacting said cylindrical outer walls of said portins of said longitudinally separable sections of said test plug body component when uninflated, said seal element body component further including an outer wall having a substantially cylindrical outer surface of substantially the same diameter as the diameter of said test plug body component when said seal element body component is uninflated as well as a pair of side walls interconnecting said inner and outer walls thereof, said side walls each being provided with an integral flange on its exterior surface in position to engage said flanges provided in said channel to limit the emergence of said side walls of said seal element body component from said outwardly opening channel of said test plug body component, said walls of said seal element body component enclosing an elongated central cavity formed therein having a major axis substantially equidistantly situated between said exterior surfaces of said inner and outer walls of said seal element body component and extending more than one half of the distance between the exterior surfaces of said side walls of said seal element body component with the midpoint of said major axis of said central cavity of said seal element body component substantially equidistantly spaced from said exterior surfaces of said side walls thereof, said elongated central cavity of said seal element body component having a minor axis measuring only a small fraction of the length of said major axis thereof when said seal element body component is uninflated, said seal element including an air valve extending through one of said walls thereof for fluid communication with said central cavity thereof, said inner and outer walls of said seal element body component assuming a substantially equally arcuate configuration when said seal element body component is inflated to bring at least the midpoint of said exterior surface of said outer wall thereof into contact with said cylindrical inner wall of said pipe while said side walls of said seal element body component move outwardly in said peripheral channel of said test plug body component a distance substantially equal to half the increase in the spacing between the midpoints of said exterior surfaces of said inner and outer walls of said seal element body component.

22. The test plug according to claim 21, wherein said air valve extends from said central cavity of said seal element body component through said inner wall thereof and then through a cavity formed by semi-cavities provided on each of said portions having at least a cylindrical outer wall of said longitudinally separable sections of said test plug body component operationally brought into registration.

23. A test plug adapted to block an extremity of a length of pipe having a cylindrical inner wall for the pressure testing thereof, comprising:

(a) a cylindrical body component adapted to be operationally positioned in said pipe with the longitudinal axis thereof operationally coaxial with the longitudinal axis of said length of pipe, said test plug body component having a circular periphery operationally uniformly spaced from the cylindrical inner wall of said pipe and including first and second longitudinally separable sections, said longitudinally separable sections of said test plug body component each including a portion having at least a cylindrical outer wall equally smaller in diameter than said circular periphery of said test plug body component, said portions of said longitudinally separable sections of said test plug body component each further including a web section extending radially outwardly from said cylindrical outer wall thereof to said circular periphery of said test plug body component, said web sections being operationally spaced at the opposite ends of said cylindrical test plug body component, said web section and said cylindrical outer wall of said portion of each of said longitudinally separable sections of said test plug body component defining an outwardly opening peripheral channel of uniform depth extending completely around said test plug body component, one of said longitudinally separable sections of said test plug body component further including means transversely closing the area thereof encompassed by said cylindrical outer wall of said portion thereof; and, (b) a seal element having a double acting, inflatable body component formed of an elastomeric material operationally substantially completely positioned in said outwardly opening peripheral channel of said test plug body component when uninflated, said seal element body component including an inner wall having a cylindrical inner surface substantially completely contacting said cylindrical outer walls of said portions of said longitudinally separable sections of said test plug body component when uninflated, said seal element body component further including an outer wall having a substantially cylindrical outer surface of substantially the same diameter as the diameter of said test plug body component when said seal element body component is uninflated as well as a pair of side walls interconnecting said inner and outer walls thereof, the thickness of each of said side walls of said seal element body component being substantially equal to one-fifth of the distance between the exterior surfaces of said side walls thereof, and said inner and outer walls of said seal element body component being of a maximum thickness adjacent said side walls of said seal element body component substantially equal to the thickness of each of said side walls thereof and being of a minimum thickness at the midpoints thereof only slightly smaller than said maximum thickness thereof, said walls of said seal element body component enclosing an elongated central cavity formed therein having a major axis substantially equidistantly situated between said exterior surfaces of said inner and outer walls of said seal element body component and extending more than one half of the distance between the exterior surfaces of said side walls of said seal element body component with the midpoint of said major axis of said central cavity of said seal element body component substantially equidistantly spaced from said exterior surfaces of said side walls thereof, said elongated central cavity of said seal element body component having a minor axis measuring only a small fraction of the length of said major axis thereof when said seal element body component is uninflated, said seal element including an air valve extending through one of said walls thereof for fluid communication with said central cavity thereof, said inner and outer walls of said seal element body component assuming a substantially equally arcuate configuration when said seal element body component is inflated to bring at least the midpoint of said exterior surface of said outer wall thereof into contact with said cylindrical inner wall of said pipe while said side walls of said seal element body component move outwardy in said peripheral channel of said test plug body component a distance substantially equal to half the increase in the spacing between the midpoints of said exterior surfaces of said inner and outer walls of said seal element body component.

24. An improved closure apparatus for blocking an opening, comprising:

a plug body component having a longitudinally axis and a pair of radially extending, axially spaced flanges defining an outwardly opening channel therebetween, said channel having a bottom wall and side walls;

an annular, hollow seal element disposed in said channel, said seal element having an inner wall contacting said bottom wall and surrounding said body component, said inner wall being under substantial compression stress when said seal element is uninflated; said seal element further having an outer wall also surrounding said body component, said outer wall being under substantial tensile stress when said seal element is uninflated; and means for inflating said seal element, whereby upon inflation said inner wall and said outer wall are displaced at least partially radially outwardly, said outer wall ultimately contacting the walls of said opening to effect a closure thereof.

25. Apparatus according to claim 24 wherein said seal element is formed of at least one initially non-circular length of stock material subsequently formed into a loop with the initially free ends thereof congruently adhesively bonded together, whereby said substantial compression stress and said substantial tensile stress are induced in said seal element prior to inflation.

26. Apparatus according to claim 25, wherein said axially spaced flanges each comprise at least one stop flange extending axially into said outwardly opening channel, and said seal element comprises at least one pair of oppositely facing, axially extending flanges situated radially inwardly relative to said at least one stop flange, whereby outward radial displacement of said seal element upon inflation is limited by contact of said flanges.

27. Apparatus according to claim 26, wherein said means for inflating comprises an air valve extending essentially radially through said plug body into said annular hollow seal element.

28. Apparatus according to claim 26, wherein said seal element comprises axially spaced end walls joining said inner and outer walls, the thickness of each of said end walls being substantially equal to one fifth the axial distance between the exterior surfaces of said end walls; and said inner and outer walls are of a maximum thickness where they join said end walls, said maximum thickness being substantially equal to said thickness of said end walls, and of a minimum thickness at the midpoints of said inner and outer walls, said minimum thickness being only slightly smaller than said maximum thickness.

29. Apparatus according to claim 25, wherein said means for inflating comprises an air valve extending essentially radially through said plug body into said annular hollow seal element.

30. Apparatus according to claim 25, wherein said seal element comprises axially spaced end walls joining said inner and outer walls, the thickness of each of said end walls being substantially equal to one fifth the axial distance between the exterior surfaces of said end walls; and said inner and outer walls are of a maximum thickness where they join said end walls, said maximum thickness being substantially equal to said thickness of said end walls, and of a minimum thickness at the midpoints of said inner and outer walls, said minimum thickness being only slightly smaller than said maximum thickness.

31. Apparatus according to claim 24, wherein said axially spaced flanges each comprise at least one stop flange extending axially into said outwardly opening channel, and said seal element comprises at least one pair of oppositely facing, axially extending flanges situated radially inwardly relatively to said at least one stop flange, whereby outward radial displacement of said seal element upon inflation is limited by contact of said flanges.

32. Apparatus according to claim 31, wherein said means for inflating comprises an air valve extending essentially radially through said plug body into said annular hollow seal element.

33. Apparatus according to claim 31, wherein said seal element comprises axially spaced end walls joining said inner and outer walls, the thickness of each of said end walls being substantially equal to one fifth the axial distance between the exterior surfaces of said end walls; and said inner and outer walls are of a maximum thickness where they join said end walls, said maximum thickness being substantially equal to said thickness of said end walls, and of a minimum thickness at the midpoints of said inner and outer walls, said minimum thickness being only slightly smaller than said maximum thickness.

34. Apparatus according to claim 24, wherein said means for inflating comprises an air valve extending essentially radially through said plug body into said annular hollow seal element.

35. Apparatus according to claim 34, wherein said seal element comprises axially spaced end walls joining said inner and outer walls, the thickness of each of said end walls being substantially equal to one fifth the axial distance between the exterior surfaces of said end walls; and said inner and outer walls are of a maximum thickness where they join said end walls, said maximum thickness being substantially equal to said thickness of said end walls, and of a minimum thickness at the midpoints of said inner and outer walls, said minimum thickness being only slightly smaller than said maximum thickness.

36. Apparatus according to claim 24, wherein said seal element comprises axially spaced end walls joining said inner and outer walls, the thickness of each of said end walls being substantially equal to one fifth the axial distance between the exterior surfaces of said end walls; and said inner and outer walls are of a maximum thickness where they join said end walls, said maximum thickness being substantially equal to said thickness of said end walls, and of a minimum thickness at the midpoints of said inner and outer walls, said minimum thickness being only slightly smaller than said maximum thickness.

37. Apparatus according to claim 36, wherein said means for inflating comprises an air valve extending essentially radially through said plug body into said annular hollow seal element.

* * * * *